United States Patent Office 3,240,330
Patented Mar. 15, 1966

3,240,330
PRESSURE SENSITIVE ADHESIVE TAPES
Henry Francis Christmas, Bristol, England, assignor to Adhesive Tapes Limited, Bristol, England
No Drawing. Filed Mar. 30, 1962, Ser. No. 183,743
Claims priority, application Great Britain, Apr. 6, 1961, 12,340/61
3 Claims. (Cl. 206—59)

This invention is concerned with the production of comparatively cheap and easily prepared release coatings suitable for application to adhesive tapes.

It is known that when ammonia or amines are reacted with maleic anhydride copolymers the maleic anhydride portion of the copolymer reacts to form a substituted amide/ammonium salt compound. These compounds, which are sometimes incorrectly referred to as amides, are more fully described as half amide, half ammonium salts. They are formed by reaction of an anhydride moiety with 2 molecules of amine. The anhydride ring opens and one half of it reacts with the amine to give rise to an amide grouping whilst the other half reacts with the second molecule of amine to give rise to a salt grouping. The expression amide/amine salt is a convenient and common designation for these compounds.

It has been found that, when a maleic anhydride-ethylene copolymer is reacted under substantially anhydrous conditions with a primary amine possessing at least one straight-chain alkyl group containing more than 12 carbon atoms, the product of reaction possesses adhesive-repellant properties. In general, the greater the number of carbon atoms in the alkyl groups, the better the coating from considerations of adhesive repellancy, and durability with time and temperature. In a preferred example, stearylamine is used, and the following is a description of the method adopted in the preparation of a release coating according to the invention:

0.5 g. of an ethylene-maleic anhydride 50:50 (molar) copolymer marketed by Monsanto Chemical Co. as DX 840/21 was dissolved in 20 ml. of acetone, and 1.1 g. of stearylamine dissolved by warming in 20 ml. of toluene. The stearylamine solution was raised to 70° C. and added to the acetone solution. An immediate green colouration was produced, which soon faded. In this case reaction was completed by refluxing the mixture for 30 minutes, but an effective coating is also produced if no further heating is carried out. The product was diluted with toluene and coated onto regenerated cellulose film. The release-coated film was primed and coated with a conventional pressure sensitive adhesive of the rubber-resin type and wound into rolls. It was found that the force required to unwind these rolls of tape was insignificant compared to a similar tape to which no release-coating had been applied.

It is not necessary to employ as much as two moles of the amine per mole of maleic anhydride units, and it is not necessary that the copolymer should contain a 50% mole proportion of maleic anhydride units. Preferably, however, at least 35 mole percent of maleic anhydride units are present, and at least 0.5 mole of amine should be caused to react with 1 mole of maleic anhydride.

In some cases it is found that the release coating has a rather short life and this may be remedied by cross-linking. Tris 2-methyl aziridinyl phosphine, known commercially as M.A.P.O., may be used, being added to the release coating composition in amounts of the order of 1%. This applies particularly where the proportion of amine is rather high. This is illustrated by the following examples.

*Example 1*

Five separate coating solutions were made, using 1 part of DX 840/21 and 2.2, 2.4, 2.6, 2.8, 3.0 parts of Armeen 18D. (Armeen 18D is a distilled grade of stearylamine containing about 95% primary amine, marketed by Armour Chemicals.) The DX 840/21 was dissolved in 40 parts acetone, and in each case the stearylamine was dissolved in 40 parts toluene. The stearylamine solutions were raised to 70° C. and added to the cold acetone solution, after which the mixtures were allowed to cool and diluted to a coating concentration of ½% w./v. After coating onto primed cellulose film and spreading with adhesive the tapes produced showed an immediate low unwind force, and this property was retained after standing for three weeks at room temperature, and also after being heated for one week at 50° C.

This example illustrates that the ratio of amine to copolymer is not critical, and also that the reaction procedure may be varied since no final reflux was given.

*Example 2*

A release coating was made substantially as described in Example 1, but in this case the 1 part of DX 840/21 was reacted with 3.4 parts of Armeen 18D. The release coated tapes, although showing a low initial unwind force, lost this property after ageing for one week at room temperature. This coating would therefore be of value when it was desired (for example, in the course of manufacture) to have a tape which would unwind very readily from a reel, whilst nevertheless intending that the ultimate customer should have a tape which did not unwind too readily.

*Example 3*

A release coating was made as described in Example 2, but before applying the coating to the primed tape, 0.05 part of M.A.P.O. was added. In this case, the coating showed the same good ageing resistance both at room temperature and at 50° C. as did those prepared as described in Example 1.

I claim:
1. A pressure sensitive adhesive tape in roll form, back coated with a release coating comprising as active release agent the half amide, half amine salt of an ethylene/maleic anhydride copolymer with a primary amine containing a straight chain alkyl group of at least 12 carbon atoms.

2. A pressure adhesive tape according to claim 1, in which the copolymer contains at least 35 mole percent of maleic anhydride units, and in which there are at least 0.5 mole of amine residue per mole of maleic anhydride.

3. A pressure sensitive adhesive tape according to claim 1 wherein the primary amine is stearyl amine and the copolymer is a copolymer of ethylene and maleic anhydride in equimolar ratios.

References Cited by the Examiner
UNITED STATES PATENTS

| | | | |
|---|---|---|---|
| 2,698,316 | 12/1954 | Grommaria | 260—78.5 |
| 2,876,894 | 3/1959 | Dahlquist et al. | 260—78.5 |
| 2,977,334 | 3/1961 | Zopf | 260—78.5 |

JOSEPH L. SCHOFER, *Primary Examiner.*
DONALD CZAJA, *Examiner.*